United States Patent
Bitonti et al.

(10) Patent No.: US 8,285,662 B2
(45) Date of Patent: Oct. 9, 2012

(54) FRAMEWORK FOR DELTA ANALYSIS DURING AUTOMATED BUILDS

(75) Inventors: Thomas F. Bitonti, Cary, NC (US); Wendell Jason Bouknight, Jr., Clayton, NC (US); James Alexander Hutton, Cary, NC (US); Dana Lea Price, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 858 days.

(21) Appl. No.: 12/362,230

(22) Filed: Jan. 29, 2009

(65) Prior Publication Data
US 2010/0191690 A1     Jul. 29, 2010

(51) Int. Cl.
*G06N 5/02* (2006.01)
(52) U.S. Cl. .......................... 706/47; 717/101
(58) Field of Classification Search .............. 706/47; 717/101
See application file for complete search history.

(56) References Cited

U.S. PATENT DOCUMENTS

| | | | |
|---|---|---|---|
| 2002/0040469 A1* | 4/2002 | Pramberger | 717/121 |
| 2006/0095276 A1* | 5/2006 | Axelrod et al. | 705/1 |
| 2006/0122981 A1* | 6/2006 | Jennery | 707/3 |
| 2010/0088669 A1* | 4/2010 | Cwalina et al. | 717/106 |

* cited by examiner

*Primary Examiner* — Kakali Chaki
*Assistant Examiner* — Mai T Tran
(74) *Attorney, Agent, or Firm* — Cuenot, Forsythe & Kim, LLC (57) ABSTRACT

A Delta Framework program (DF) automatically detects and prevents breaking scenarios during an automated software build by identifying a build artifact from a list of build artifacts in a repository; comparing the build artifact to a current software build; identifying a delta between the build artifact and the current software build; determining whether the delta has a link to a rule in the rules database; responsive to the artifact having a link to a rule, determining whether the rule identifies a breaking scenario; responsive to the rule identifying the breaking scenario, taking an action specified by the rule.

15 Claims, 3 Drawing Sheets

FRAMEWORK FOR DELTA ANALYSIS DURING AUTOMATED BUILDS

BACKGROUND OF THE INVENTION

1. Field of the Invention

The Delta Framework Software relates generally to automated software program development and more specifically to error detection and correction during an automated software build.

2. Description of the Related Art

In a large-scale software development project, multiple developers work independently creating numerous source code components. At some point, the numerous software components must be compiled and packaged for delivery either to testers or end users. The process of compiling and packaging the numerous software components is referred to in the industry as a "software build."

The success of the large-scale software development project depends, to a large degree, on the accuracy, reliability, and repeatability of the software build. The software build must use the correct versions of source code files, dependent library modules, and compilation and assembly tools. One way to ensure the accuracy, reliability, and repeatability of the software build is to automate the software build process. However, an automated software build requires scripts and batch files for the automation process. Moreover, the complexity of the automation code will increase as the large-scale software development project progresses. An example of a tool for an automated software build is IBM® WebSphere Studio Application Developer, when it is used in conjunction with ANT open-source tools. (See *Performing Unattended Daily Builds with WebSphere Studio and ANT, parts* 1-3, by Diane Bowker, David Leigh, and Mark Wainwright, Apr. 1, 2004.)

Automating a software build in a large-scale software development project also requires management of the software build because the large-scale software development project will span multiple software development disciplines and the management is often performed by using error prone and large manual processes. An example of a tool to manage large scale software development is IBM® Rational Build Forge. IBM® Rational Build Forge reduces manual activity at integration points and automatically captures relevant data for compliance, governance, and project management. Functions of IBM® Rational Build Forge include a library of best practices that are used from project to project to reduce setup time, improve scalability, and improve efficiency and quality, auto documentation of key processes to provide an audit trail of process changes for compliance management, integration with existing tools across multiple platforms, support for threading so that software builds can run concurrently in discrete processes, and pre-testing codes by running builds safely on-demand from within an Eclipse-based IDE. (See *Automated Build Management for Enterprise Quality Management and Build-Driven Agility*, Carey Benge, Apr. 15, 2007)

Thus, build automation, for a large-scale software development project, requires accuracy, reliability, and repeatability while spanning multiple software development disciplines. Many large-scale software development projects involve modifications to prior software deliverables requiring a code that must be written to make additions, deletions, or modifications to software previously developed. Thus, a large-scale software development project may involve a second generation build of an original software product or any number of succeeding generations of the software product.

Working in large-scale development projects for revisions to prior software creates unique problems that a first time project would probably not encounter. Specifically, multiple development teams must deal with extensive modifications and complicated mixes of codes such as UML, Java, Scripts, Templates, XML, XML Transforms, and others. Thus, as multiple development teams make changes to the prior software build, the changes may cause the new software build to break.

The software build may break because breaking changes between drivers of the software build, or between drivers of the present version and the drivers of a previous generally-available version of the software build being revised, are not detected early in the software build process. For example, changes made to a software build of a new release of previously released versions of a software product can break customer's scripts, migration scenarios, scenarios where multiple versions of the product interact programmatically, scenarios where multiple versions of the product share data, established coding practices, and "stack" products that rely on certain aspects of the product being built. There are a number of existing practices to address detection of breaking changes.

One existing practice is the use of compilation and linkage checks. However, these compilation and linkage checks cannot detect code changes that affect scripts, XML templates, and other non-code artifacts during the software build. Another existing practice is to use code difference tooling. However, tools can identify dependencies that will change the build requirements of the driver, the runtime requirements of the driver or the build and runtime requirements together of the driver. However, the identification of dependencies is static and the identification of each dependency must be accomplished manually.

Another existing practice is to execute code reviews of changes between the software build and the prior released version. But to be effective in avoiding breaking changes, every change would require a code review. In addition, the code review would require the participation of subject matter experts with extensive working knowledge of the previous version contents and all possible breaking scenarios. Automated code review tools do not remedy this problem. For example, Eclipse's TPTP and XML source code analysis tools, and other automated code review tools only provide a static code analysis by comparing the code being built to a previous version of the code and identifying differences.

Finally, it is an existing practice to test the code being built for breaking scenarios. Testing the build can detect if there is a problem, but testing alone does not identify which change in the multitude of software build changes caused the problem. Therefore, additional debugging and analysis is required by either the testers or the developers, or both the testers and the developers to identify the change. Once the change is detected, additional work is necessary to implement a solution. Then, once the solution is implemented, additional testing must be conducted. Detection late in the cycle is costly. Moreover, testing for breaking scenarios is not necessarily limited to the available resources. For example, one test may detect a single breaking change, but the same type of change may not be detected in all situations, where this type of change is introduced, but not tested.

Thus, software development is often complicated by the use of different code types, extensive revisions, and multiple development teams. Detecting and tracking changes is difficult and error prone. These changes can result in incompatible or "broken" drivers or links. Present code analysis techniques are static, and are limited to detecting coding errors per se.

Other code analysis techniques detect changes between code versions without identifying errors. Thus, the existing practices provide static code analysis on a single version of code, or identify the differences between two versions. However, the existing practices cannot automatically identify breaking scenarios caused by the differences and prevent the breakage. Therefore, a need exists for a way to automatically identify breaking scenarios and prevent the breakages. Moreover, a need exists for a way to detect the breaking scenarios as early as possible in the code development cycle in order to save time, money, and effort, thereby ensuring a higher quality product at a lower cost.

BRIEF SUMMARY OF THE INVENTION

A Delta Framework program (DF) automatically detects and prevents breaking scenarios during an automated software build by identifying a build artifact from a list of build artifacts in a repository; comparing the build artifact to a current software build; identifying a delta between the build artifact and the current software build; determining whether the delta can be linked to a rule in a rules database; responsive to the artifact responsible for the delta having a link to a rule, determining whether the rule identifies a breaking scenario; and responsive to the rule identifying the breaking scenario, taking an action specified by the rule.

The DF allows people outside the build process to provide rules. The creation of the rules is a manual process. Subject matter experts, who are persons most knowledgeable, but not necessarily involved in the build process, provide descriptions of problem scenarios to allow persons working on the build to create one or more rules to be added to the rule database. Subject matter experts may create rules directly, or they may create rules in cooperation with persons working on the build. In addition, persons working on the build can create a rule by themselves at the time a situation arises. The rules created by either the subject matter experts, the persons working on the build, or the persons working on the build in cooperation with the subject matter experts, contain pointers to a build artifact so that when the build artifact is identified by a delta resulting from a comparison to a newly generated artifact, the rule will be identified by the delta. A rule generation program (RGP) is adapted to create a new rule in the rules database by having a subject matter expert, a person working on a build, or a person working on the build in cooperation with a subject matter expert, identify a build artifact, describe a scenario involving a problem with the build artifact, create a rule to solve the problem, enter the rule and an associated action to be taken, and link the rule to the build artifact. Thus, when a delta is identified between a new build artifact and a prior build artifact, and when the prior build artifact has a link to a rule, the delta will be linked to the rule.

The DF can monitor the build process continuously or it can be run at specified plug-in points during the build process. Thus, at each stage of the build process, a determination can be made of which rules need to be applied. Thus, problems can be fixed before moving on to the next phase of the build.

DETAILED DESCRIPTION OF THE INVENTION

As appreciated by one skilled in the art, the Delta Framework may be embodied as a system, method or computer program product. Accordingly, the Delta Framework Software may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the Delta Framework Software may take the form of a computer program product embodied in any tangible medium of expression having computer-usable program codes embodied in the medium.

Any combination of one or more computer-usable or computer-readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash Memory), an optical fiber, a portable compact disc read-only memory (CDROM), an optical storage device, a transmission media such as those supporting the Internet or intranet, or a magnetic storage device. Note that the computer-usable or computer-readable medium could even be paper or another suitable medium upon which the program is printed, as the program can be electronically captured, via, for instance, optical scanning of the paper or other mediums, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in the baseband or as part of a carrier wave. The computer-usable program code may be transmitted using any appropriate medium, including but not limited to wireless, wireline, optical fiber cable, RF, etc.

The computer-usable program code for carrying out operations of the Delta Framework Software may be written in any combination of one or more programming languages, including object oriented programming languages such as Java, Smalltalk, C++ or the like, and conventional procedural programming languages, such as the "C" programming language or similar programming languages. The computer-readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The Delta Framework Software is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, a special purpose computer, or other programmable data processing apparatuses to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, or other programmable data processing apparatuses, to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatuses to cause a series of operational steps to be performed on the computer or other programmable data processing apparatuses to produce a computer implemented process such that the instructions, which are executed on the computer or other programmable data processing apparatus, provide processes for implementing the functions/acts specified in the flowchart and/or block diagram block or blocks.

Figure 1:
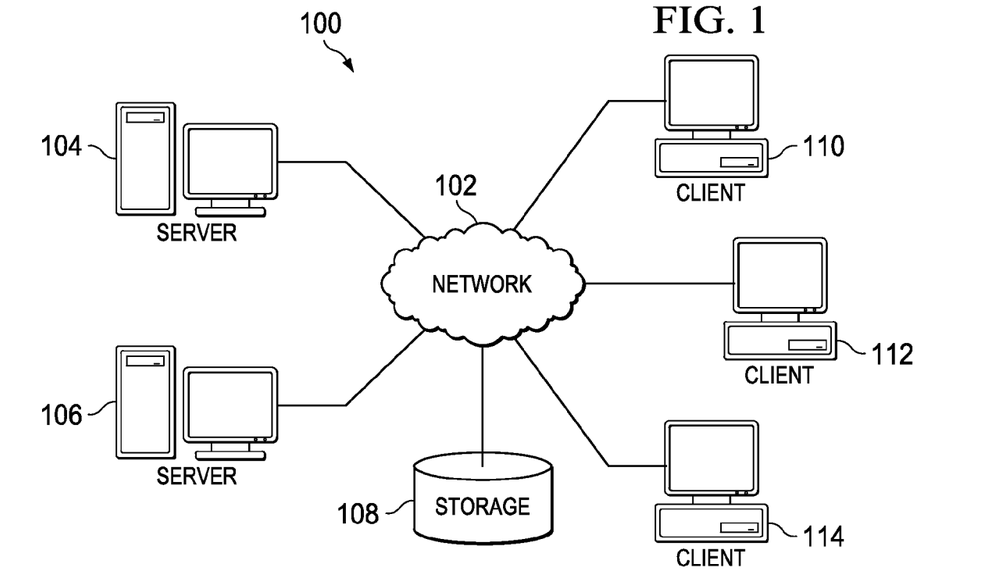
FIG. 1 depicts an exemplary computer system.
Figure 2:
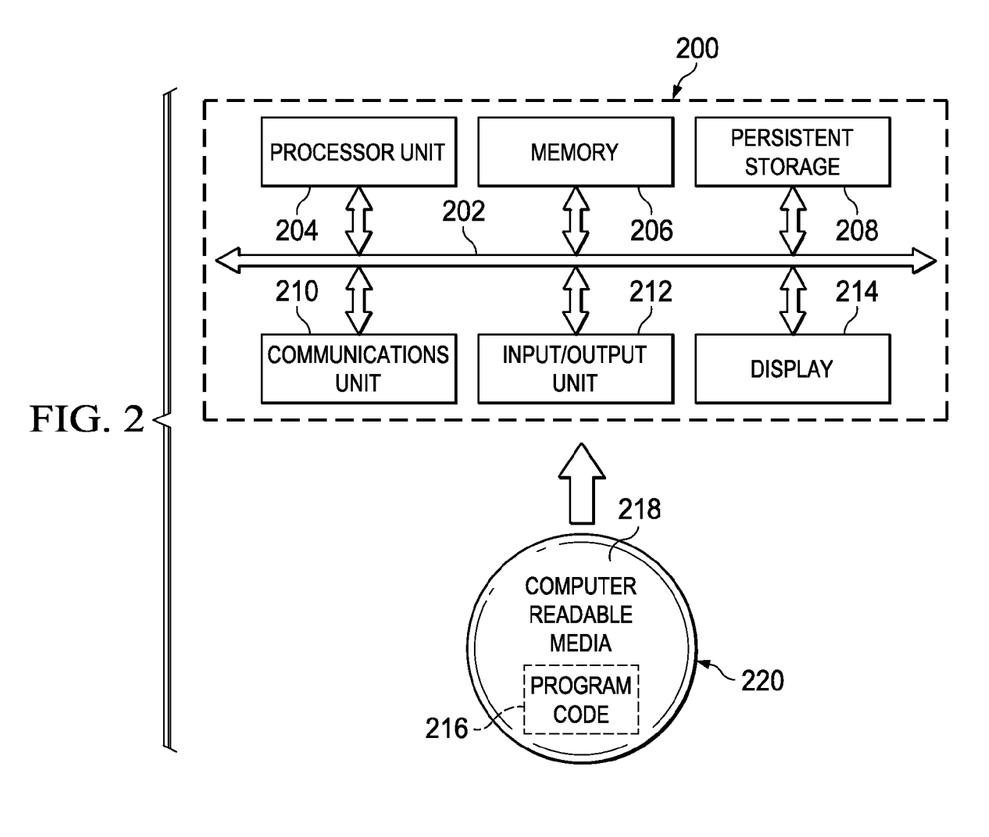
FIG. 2 depicts an exemplary computer framework.

With reference now to the figures, and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments, in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 106 and server 104 connect to network 102 along with storage unit 108. In addition, clients 110, 112, and 114 connect to network 102. Clients 110, 112, and 114 may be, for example, personal computers or network computers. In the depicted example, server 106 provides data, such as boot files, operating system images, and applications to clients 110, 112, and 114. Clients 110, 112, and 114 are clients to server 106 in this example. Network data processing system 100 may include additional servers, clients, and other devices not shown.

Program code located in network data processing system 100 may be stored on a computer-recordable storage medium and downloaded to a data processing system or other device for use. For example, program code may be stored on a computer-recordable storage medium on server 106 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 106 or client 110 in FIG. 1, in which computer-usable program codes or instructions implementing the process may be located in the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile, storage devices. Persistent storage 208 may take on various forms depending on the particular implementation. For example, persistent storage 208 may contain one or more components or devices, may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provide communication with other data processing systems or devices. In these examples, communications unit 210 is a network interface card. Communications unit 210 may provide communication through the use of either or both physical and wireless communication links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located in persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer recordable storage media. In some instances, computer recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, a program code stored in a computer-readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown.

The different embodiments may be implemented using any hardware device or system capable of executing a program code. As one example, the data processing system may include inorganic components integrated with organic components and/or may be comprised entirely of organic components excluding a human being. For example, a storage device may be comprised of an organic semiconductor. As another example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides a transfer of data between different components or devices attached to the bus system. Additionally, a communications unit may include one or more devices used to transmit and receive data, such as a modem or a network adapter. Further, a memory may be, for example, memory 206 or a cache, such as found in an interface and a memory controller hub that may be present in communications fabric 202.

Figure 3:
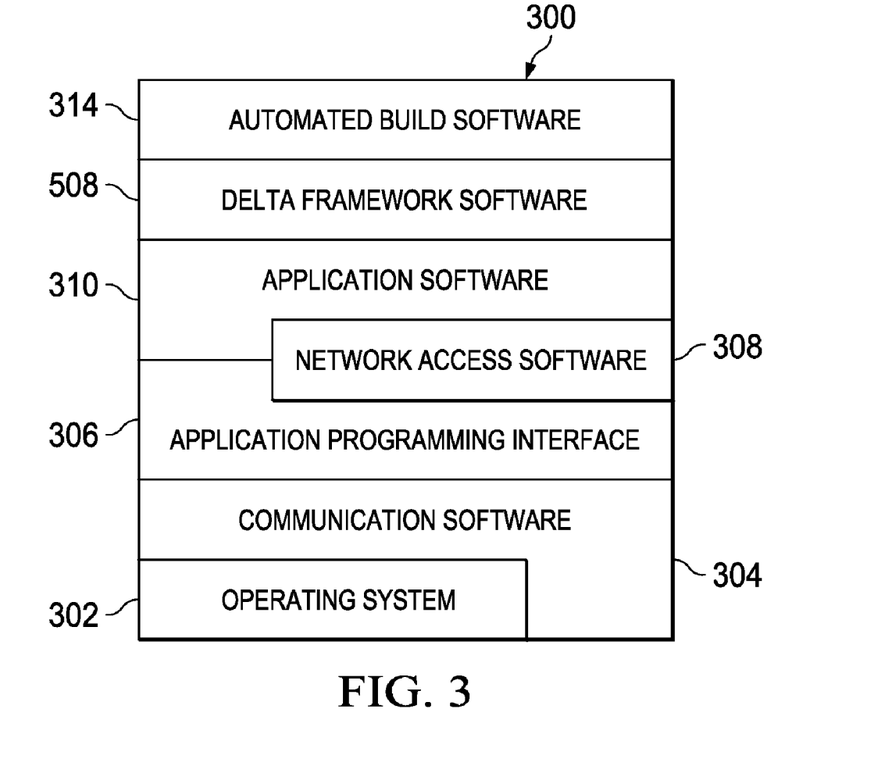
FIG. 3 depicts a memory containing the Delta Framework Software and related software.

Referring to FIG. 3, typical software architecture for a server-client system is depicted in accordance with an illustrative embodiment. At the lowest level, operating system 302 is utilized to provide high-level functionality to the user and to other software. Such an operating system typically includes a basic input output system (BIOS). Communication software 304 provides communications through an external port to a network, such as the Internet, via a physical communications link by either directly invoking an operating system functionality or indirectly bypassing the operating system to access the hardware for communications over the network.

Application programming interface (API) 306 allows the user of the system, such as an individual or a software routine, to invoke system capabilities using a standard consistent interface without concern for how the particular functionality is implemented. Network access software 308 represents any software available for allowing the system to access a network. This access may be to a network, such as a local area network (LAN), wide area network (WAN), or the Internet. With the Internet, this software may include programs, such as Web browsers. Application software 310 represents any number of software applications designed to react to data through the communications port to provide the desired functionality the user seeks. Applications at this level may include those necessary to handle data, video, graphics, photos or text, which can be accessed by users of the Internet. The mechanism of Delta Framework Software 508 may be implemented within communication software 304 in these examples. Delta Framework Software 508 interacts with Automated Build Software 314 as it will be further discussed below.

Figure 4:
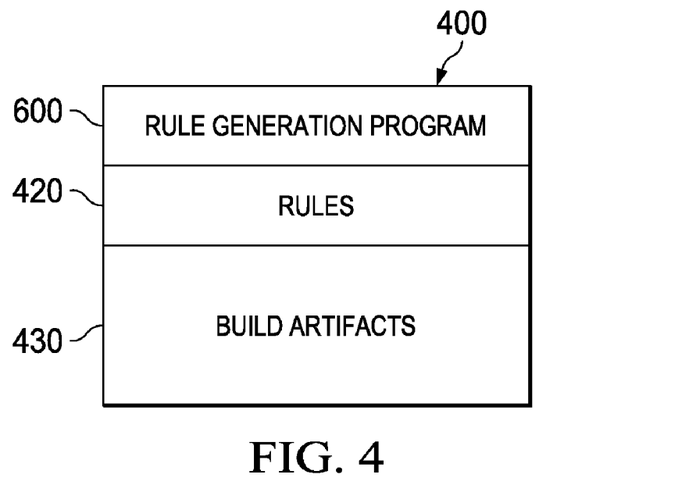
FIG. 4 depicts a repository containing build artifacts, a database containing rules, and a rule generation software.

FIG. 4 depicts an exemplary memory or storage containing Rule Generating Software (Program) 600, Rules 420, and Build Artifacts 430. Persons skilled in the art will recognize that Build Artifacts 430 would typically be stored in a separate memory or storage from Rules 420 and Rule Generating Software 600. Rather Build Artifacts 430 would be stored in a separate repository to facilitate applying Rules 420 to many different builds.

As used herein, "automated build software" means a computer program used by multiple developers to compile and package a plurality of software components for delivery to a tester or to an end user.

As used herein, "scenario" means a description of a breaking condition within a build artifact.

As used herein, "rule" means a mandatory condition associated with a scenario that, when followed, will prevent the breaking condition from occurring.

As used herein, "delta" means a difference identified by a comparison of a current build artifact to a prior build artifact.

As used herein, "action" means an action to be taken either automatically or by a developer to fix an occurrence of a broken rule.

As used herein, an "artifact" means a code segment.

As used herein, "prior build artifact" means an artifact from a prior version of a software build.

As used herein, "current build artifact" means an artifact from a current version of a software build being compiled and assembled by an automated build software.

As used herein, "continuous mode" means that the delta framework program runs continuously when the automated build software is running.

As used herein, "plug-in point" means a designated point in the automated build process, that when reached, causes the delta framework program to be run automatically.

As used herein, "subject matter expert" means a person designated to support software development for a build based on expertise such as knowledge of the needs and requirements of the end user of the software being developed, technical requirements of the languages used in the build, and any other area related to problem scenarios that can arise during a build or that have arisen during a build.

Figure 5:
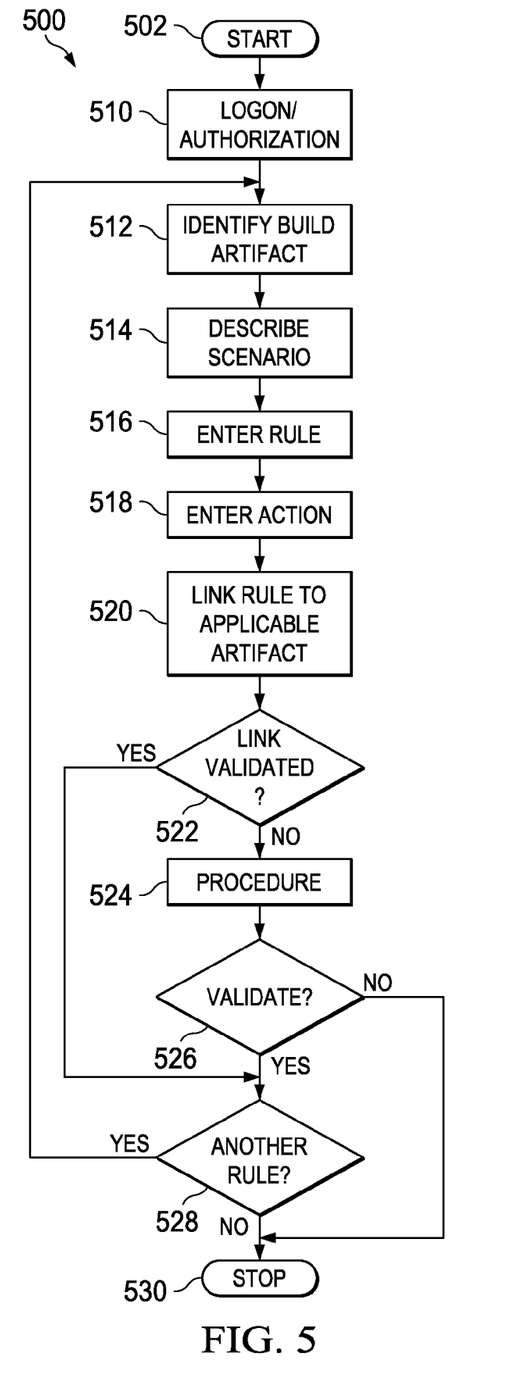
FIG. 5 depicts a flowchart of the logic of the rule generation software.

FIG. 5 depicts a flow chart of the logic of Rule Generation Program (RGP) 500. RGP 500 starts (502) when a user logs on and establishes authorization (510). The user identifies a build artifact (512) and describes a scenario (514). The build artifact is identified because of a problem encountered in creating the particular build artifact The problem encountered is described as a scenario. Next, the user enters a rule (516) to be applied to the scenario and an appropriate action to be taken when the scenario arises (518). The rule and the appropriate action to be taken may be entered by a person working on the build, or it may be entered by a subject matter expert. Next the user links the rule to the appropriate build artifact in the build. (520) The user determines whether the link is validated (522). If the link does not validate (522), then a link procedure is accessed, and validation is again attempted (526). If validation occurs, at either step 522 or step 526, RGP 500 determines if the user desires to enter another rule (528). If the user does want to enter another, rule RGP 500 stops (530).

One exemplary scenario may be that customer scripts break when the documented Application Program Interfaces (APIs) change. The rule created for this scenario is that Public APIs cannot be removed. The action to be taken if a public API is removed is that the build fails, the developer is notified with a message and a pointer to the product public API documentation. In this way, the problem is identified immediately upon occurrence during the build.

Another exemplary scenario is that serialized classes cannot be de-serialized properly. The rule to be applied is that the universally unique identifier (UUID) of changed serialized classes must be modified. The action to be taken is that the compilation fails and the developer is notified.

Another exemplary scenario is that synchronization between diverse levels of the product breaks when serialized exceptions are passed between them. The rule is that all serialized exceptions in the previous product must be packaged in subsequent versions of the product. The action to be taken is that the build packaging fails, and the developer is notified with a message including the exception information.

A further exemplary scenario is that a legal restriction is broken. The rule to be applied is that disallowed packages are not to be used. Examples of disallowed packages are open source, freeware, competitor's advanced compiler levels and so forth. The action to be taken is that product compilation fails and corporate legal counsel is notified.

Yet another exemplary scenario is that product configuration files cannot be parsed. The rule is that UML attributes or objects are not to be removed from a class diagram. The action to be taken is that UML processing fails, the developer is notified of the disallowed change in the UML class diagram, and an email is sent to the class diagram owner.

There are literally millions of rules and actions that can be defined. The DF allows the rules to be plugged into the build process as needed, by the subject matter experts that are addressing the breaking changes. The rules can be defined against individual elements in the build environment such as a single Java file, or they can be defined against an entire set of artifacts—i.e. the installable image.

Figure 6:
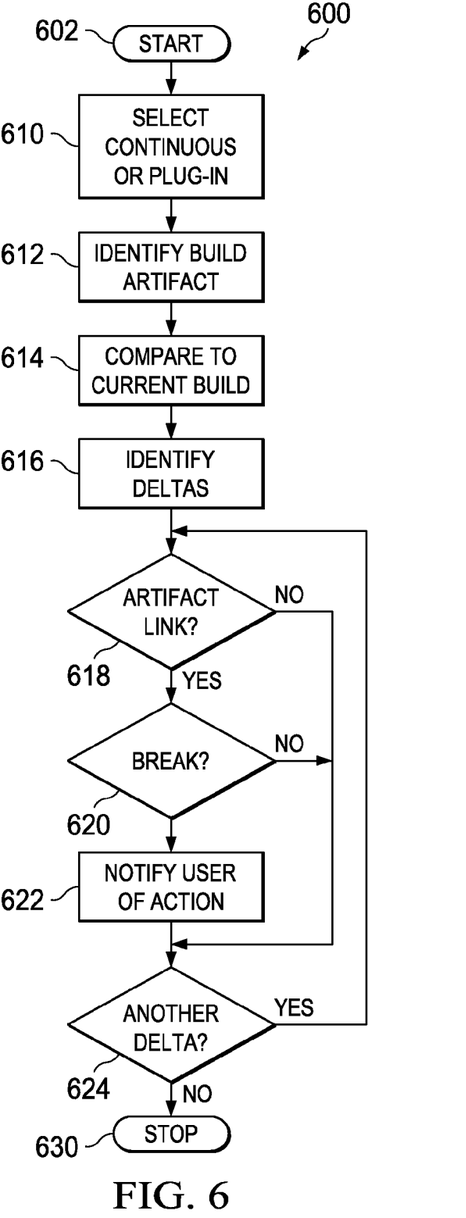
FIG. 6 depicts a flowchart of the logic of Delta Framework Software.

FIG. 6 depicts a flow chart of the logic of Delta Framework Program (DFP) 600. DFP 600 starts (602) and the user selects continuous mode or plug-in point mode (610). The user identifies an original build artifact (612) and DFP 600 compares the current build to the original artifact that was identified (614). DFP 600 identifies all deltas (616) and then each delta determines whether there is an artifact link to a rule (618). Next, DFP 600 determines whether the rule identifies a break (620) and if so, notifies the user of an action to be taken (622). Alternatively, DFP 600 could automatically take the action called for and then notify the user (not shown). DFP 600 determines whether there is another delta. If so, DFP 600 goes to step 618 and if not, DFP 600 stops (630).

The flowchart and block diagrams in the figures illustrate the architecture, functionality, and operation of possible implementations of systems, methods and computer program products according to various embodiments of the Delta Framework Software. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the orders noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting to the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, are intended to include any structure, material, or act for performing the function in combination with other claimed elements as specifically claimed. The description of the Delta Framework Software has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program codes for use by, or in connection with, a computer or any instruction execution system. For the purposes of this description, a computer-usable or computer-readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disks-read only memory (CD-ROM), compact disks-read/write (CD-R/W) and DVDs.

A data processing system suitable for storing and/or executing program codes will include at least one processor coupled directly or indirectly to memory elements through a system bus. The memory elements can include local memory employed during actual execution of the program code, bulk storage, and cache memories, which provide temporary storage of at least some program codes in order to reduce the number of times the code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems, remote printers or storage devices through intervening private or public networks. Modems, cable modems and Ethernet cards are just a few of the currently available types of network adapters.

The description of the Delta Framework Software has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented process to automatically identify a breaking scenario during an automated software build, comprising:
   using a computer, performing the following series of steps:
      identifying a build artifact from a list of build artifacts in a repository;
      comparing the build artifact to a current software build;
      identifying a delta between the build artifact and the current software build;
      determining whether the delta can be linked to a rule in the rules database;
      responsive to the delta being linked to a rule, determining whether the rule identifies a breaking scenario; and
      responsive to the rule identifying the breaking scenario, taking an action specified by the rule.

2. The computer implemented method of claim 1 further comprising:
   creating a new rule in the rules database by
      identifying a new build artifact,
      describing a scenario involving a problem,
      creating the new rule to solve the problem,
      entering the new rule and an associated action to be taken into the rules database, and
      linking the new rule to the new build artifact.

3. The computer implemented method of claim 1, wherein the method performs continuously during the automated software build.

4. The computer implemented method of claim, wherein the method performs at a plug-in point during the automated software build.

5. The computer implemented method of claim 1, further comprising
   identifying a second delta between the build artifact and the current software build;
   determining whether the second delta can be linked to a different rule in the rule database;
   responsive to the second delta being linked to a second rule, determining whether the second rule identifies a second breaking scenario; and
   responsive to the second rule identifying the second breaking scenario, taking an action specified by the second rule.

6. A programmable apparatus for automatically identifying a breaking scenario during an automated software build, comprising:
   a computer having a memory and is connected to a rules database; and
   a delta framework program in the memory, the computer being directed by the delta framework software to perform the following steps:
      identifying a build artifact from a list of build artifacts in a repository;
      comparing the build artifact to a current software build;
      identifying a delta between the build artifact and the current software build;
      determining whether the delta has a link to a rule in the rules database;
      responsive to the artifact having a link to a rule, determining whether the rule identifies a breaking scenario; and
      responsive to the rule identifying the breaking scenario, taking an action specified by the rule.

7. The programmable apparatus of claim 6 further comprising:
   a rule generation module in the rule database; wherein
   the rule generation module, responsive to a user input, is configured to create a new rule by
      identifying a new build artifact,
      describing a scenario involving a problem with a delta between the new build artifact and the current software build,
      creating the new rule to solve the problem,
      entering the new rule and an associated action to be taken into the rules database, and
      linking the new rule to the new build artifact.

8. The programmable apparatus of claim 6, wherein the method performs continuously during the automated software build.

9. The programmable apparatus of claim 6, wherein the method performs at a plug-in point during the automated software build.

10. The programmable apparatus of claim 6, wherein the computer being directed by the delta framework software to further perform:
   identifying a second delta between the build artifact and the current software build;
   determining whether the second delta can be linked to a different rule in the rules database;
   responsive to the second delta being linked to a second rule, determining whether the second rule identifies a second breaking scenario; and
   responsive to the second rule identifying the second breaking scenario, taking an action specified by the second rule.

11. A computer program product comprising a computer readable storage medium not including a propagated signal having stored therein computer usable program code for causing a computer to automatically identify a breaking scenario during an automated software build, the computer usable program code, which when executed by a computer hardware system, causes the computer hardware system to perform:
   identifying a build artifact from a list of build artifacts in a repository;
   comparing the build artifact to a current software build;
   identifying a delta between the build artifact and the current software build;
   determining whether the delta had a link to a rule in a rules database;
   responsive to the delta being linked to the rule, determining whether the rule identifies a breaking scenario; and
   responsive to the rule identifying the breaking scenario, taking an action specified by the rule.

12. The computer program product of claim 11, further comprising:
   creating a new rule, responsive to a user input, by
      identifying a new build artifact,
      describing a scenario involving a problem with a delta between the new build artifact and the current software build,
      creating the new rule to solve the problem,
      entering the new rule and an associated action to be taken into the rules database, and
   linking the new rule to the new build artifact.

13. The computer program product of claim 11, wherein the method performs continuously during the automated software build.

14. The computer program product of claim 5, wherein the method performs at a plug-in point during the automated software build.

15. The computer program product of claim 11, further comprising
   identifying a second delta between the build artifact and the current software build;
   determining whether the second delta can be linked to a different rule in the rules database;
   responsive to the second delta being linked to a second rule, determining whether the second rule identifies a second breaking scenario; and
   responsive to the second rule identifying the second breaking scenario, taking an action specified by the second rule.

* * * * *